US009479224B2

(12) United States Patent
Choi et al.

(10) Patent No.: US 9,479,224 B2
(45) Date of Patent: Oct. 25, 2016

(54) APPARATUS AND METHOD FOR CONNECTING TO DEVICE IN WIRELESS TERMINAL

(71) Applicant: Samsung Electronics Co., Ltd., Suwon-si, Gyeonggi-do (KR)

(72) Inventors: Jong-Mu Choi, Gunpo-si (KR); Chang-Soon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/816,735

(22) Filed: Aug. 3, 2015

(65) Prior Publication Data

US 2015/0341976 A1 Nov. 26, 2015

Related U.S. Application Data (63) Continuation of application No. 13/688,593, filed on Nov. 29, 2012, now Pat. No. 9,118,355.

(30) Foreign Application Priority Data

Nov. 30, 2011 (KR) .......... 10-2011-0126681

(51) Int. Cl.
| | | |
|---|---|---|
| *H04B 5/00* | (2006.01) | |
| *H04W 12/06* | (2009.01) | |
| *H04W 4/00* | (2009.01) | |
| *H04W 76/02* | (2009.01) | |
| *H04M 1/725* | (2006.01) | |

(52) U.S. Cl.
CPC .......... *H04B 5/0031* (2013.01); *H04W 4/008* (2013.01); *H04W 12/06* (2013.01); *H04W 76/023* (2013.01); *H04M 1/7253* (2013.01)

(58) Field of Classification Search
CPC .......................... H04W 8/005; H04W 4/008
USPC ................ 455/41.1–41.3, 411, 436
See application file for complete search history.

(56) References Cited

U.S. PATENT DOCUMENTS

| | | | |
|---|---|---|---|
| 6,892,052 | B2 | 5/2005 | Kotola et al. |
| 8,224,246 | B2 * | 7/2012 | Suumaki ............. G06F 7/10237 455/41.1 |
| 2006/0239236 | A1 | 10/2006 | Otsuka |
| 2008/0242343 | A1 * | 10/2008 | Koh ................. H04M 1/27455 455/550.1 |
| 2010/0081375 | A1 | 4/2010 | Rosenblatt et al. |
| 2011/0044308 | A1 | 2/2011 | Kawamura |
| 2011/0275316 | A1 | 11/2011 | Suumaki et al. |
| 2013/0095762 | A1 | 4/2013 | Inagaki et al. |

FOREIGN PATENT DOCUMENTS

| | | |
|---|---|---|
| EP | 2 302 882 A1 | 3/2011 |
| JP | 2003-032175 A | 1/2003 |

(Continued)

*Primary Examiner* — Tuan H Nguyen
(74) *Attorney, Agent, or Firm* — Jefferson IP Law, LLP (57) ABSTRACT

An apparatus and a method for connecting to a device in a wireless terminal, and more particularly, to an apparatus and method for more conveniently connecting to a desired device in a communication mode of a wireless terminal are provided. The apparatus includes a near distance communication module for exchanging device information for a communication connection through a contact with a specific device, and a controller for controlling the near distance communication module to connect communication to the specific device based on the exchanged device information.

30 Claims, 3 Drawing Sheets

(56) References Cited

FOREIGN PATENT DOCUMENTS

| JP | 2005-323092 A | 11/2005 |
| JP | 2006-303924 A | 11/2006 |
| JP | 2008-098893 A | 4/2008 |
| JP | 2009-171409 A | 7/2009 |
| JP | 2011-147004 A | 7/2011 |
| WO | 03/081787 A2 | 10/2003 |

* cited by examiner

APPARATUS AND METHOD FOR CONNECTING TO DEVICE IN WIRELESS TERMINAL

PRIORITY

This application is a continuation application of prior application Ser. No. 13/688,593, filed on Nov. 29, 2012, which claimed the benefit under 35 U.S.C. §119(a) of a Korean Patent Application filed in the Korean Intellectual Property Office on Nov. 30, 2011 and assigned Ser. No. 10-2011-0126681, the entire disclosure of which is hereby incorporated by reference.

BACKGROUND OF THE INVENTION

1. Field of the Invention

The present invention relates to an apparatus and method for connecting to a device in a wireless terminal. More particularly, the present invention relates to an apparatus and method for more conveniently connecting to a desired device in a communication mode of a wireless terminal.

2. Description of the Related Art

Wi-Fi Peer to Peer (Wi-Fi P2P) or Wi-Fi Direct technology is technology for providing a direct connection between Wi-Fi terminals by using an existing Wi-Fi interface without having to communicate with an Access Point (AP) that is an existing medium in infrastructure networks.

The existing Wi-Fi technology generally relates to a connection to the Internet through an AP. Accordingly, there has been a lack of development to Wi-Fi technology as it relates to direct communication between Wi-Fi terminals.

This lack has been somewhat supplemented through the use of Bluetooth technology. However, Bluetooth technology has certain limitations associated with a transmission distance and a transmission speed. Consequently, Wi-Fi P2P technology is expected to cover the portion of communication between terminals that Bluetooth does not supplement.

Although the existing Wi-Fi technology also supports a direct connection in an Ad-hoc mode, the Ad-hoc technology has not been effectively commercialized. In other words, the Ad-hoc technology has rarely been used in practice due to various disadvantages associated with the Ad-hoc technology. For example, disadvantages associated with the Ad-hoc technology include vulnerability in security, power consumption, and limited transmission speeds (e.g., throughput traffic being limited to 11 Mbps).

The Wi-Fi Direct technology supplements vulnerability in security by supporting a security mode of Wi-Fi Protected Access 2 (WPA2) and supports simpler connectivity between Wi-Fi terminals than before by using a Wi-Fi Simple Configuration (WSC). In addition, the Wi-Fi Direct technology drastically improves throughput compared with the Ad-hoc technology by supporting wireless networking standard IEEE 802.11n and by using an enhanced power consumption algorithm.

A Wi-Fi Direct function is based on IEEE 802.11, legacy Wi-Fi standards, is compatible with existing Wi-Fi terminals, and can be easily upgraded without a change in hardware.

A Peer to Peer (P2P) group indicates a set of Wi-Fi terminals connected to each other by using the Wi-Fi P2P technology. Assuming that devices are connected on a one-to-one basis, one device operates as a Group Owner (GO) and the other device operates as a Group Client (GC). In this case, the GO terminal functions as a Wireless Local Area Network (WLAN) AP and the GC terminal functions as a WLAN station.

Such a role of each P2P terminal is determined by using a P2P-only protocol, (i.e., GO Negotiation, in a Wi-Fi P2P connection process).

The generation of a P2P group based on the Wi-Fi P2P technology can be achieved by a 1:1 connection or a 1:N connection, and the number of acceptable GCs is determined based on the capability of a GO terminal.

In a Wi-Fi P2P connection process, devices are searched for through a Device Discovery process, and a Provision Discovery process is performed with a device desiring connection from among the searched devices.

The Provision Discovery process is a process of informing the device desiring connection of a connecting method, and a Web Service Connector (WSC) connection method includes a Push Button Configuration (PBC) method performed in response to a button input and a Personal Identification Number (PIN) method performed in response to a PIN number input.

Accordingly, a device which requests Provision Discovery transmits a message associated with a desired connection method. A device which has received the message corresponding to another device's request for Provision Discovery informs a user thereof of the message reception through a pop-up window.

The pop-up window displayed in response to receipt of a message corresponding to another device's request for Provision Discovery contains information, such as a device name of the device which has requested Provision Discovery. The pop-up window allows the user of the device which has received the message to determine whether the connection is accepted and whether to enable a WSC.

After the Provision Discovery process, a GO Negotiation process is performed to determine roles of the devices. A device determined to be a GO operates as an AP, and a device determined to be a GC operates as a Wi-Fi station.

When the device roles, GO and GC, are determined, the two devices complete a P2P connection by exchanging authentication information, such as authentication type, encryption type, network key, and Service Set identifier (SSID), through a Provisioning process.

However, every time connection to a device is performed through the Wi-Fi P2P connection process, a desired device should be selected through the Device Discovery process, and the above-described connection processes should be performed. In addition, when no desired device is discovered in the Device Discovery process, it is inefficient and burdensome to repeatedly perform the Device Discovery process until a desired device is discovered.

Accordingly, there is a need for a method and apparatus for connecting to a device in a wireless terminal to conveniently perform a Wi-Fi Direct connection while exchanging device information for a communication connection to a desired device through near distance communication of the wireless terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for connecting to a device in a wireless terminal to conveniently connect communication to a desired device in a communication mode of the wireless terminal.

Another aspect of the present invention is to provide an apparatus and method for connecting to a device in a wireless terminal to conveniently perform a Wi-Fi Direct connection while exchanging device information for a communication connection to a desired device through near distance communication of the wireless terminal.

According to one aspect of the present invention, an apparatus for connecting to a device in a wireless terminal is provided. The apparatus includes a near distance communication module for exchanging device information for a communication connection through a contact with a specific device, and a controller for controlling the near distance communication module to connect communication to the specific device based on the exchanged device information.

According to another aspect of the present invention, a method of connecting to a device in a wireless terminal is provided. The method includes if a specific device is contacted, exchanging device information for a communication connection through near distance communication, and connecting communication to the specific device based on device information received from the specific device.

According to another aspect of the present invention, a method of connecting a wireless terminal to a device through a near distance communication connection is provided. The method includes determining whether the wireless terminal is connected to a specific device via the near distance communication connection, exchanging, if the wireless terminal is connected to the specific device via the near distance communication connection, device information between the wireless terminal and the specific device over the near distance communication connection, and establishing a second connection between the wireless terminal and the specific device based on the exchanged device information.

According to an aspect of the present invention, a method is provided. The method includes receiving, at an electronic device including a first communication module and a second communication module, a signal from an external device using the first communication module while the second communication module is in a first state, transitioning the second communication module to a second state based at least in part on the signal, and establishing, using the second communication module, a communication between the electronic device and the external device based at least in part on the transitioning.

According to an aspect of the present invention, an apparatus is provided. The apparatus includes a first communication module configured to provide a first wireless communication, a second communication module configured to provide a second wireless communication, and a controller operatively coupled with the first communication module and the second communication module, the controller configured to receive, using the first communication module, a signal from an external device in accordance with the first wireless communication while the second communication module is in a first state, transition the second communication module to a second state based at least in part on the signal, and establish, using the second communication module, the second wireless communication between the electronic device and the external device based at least in part on the transitioning.

According to an aspect of the present invention, a method is provided. The method includes transmitting, at an electronic device including a first communication module and a second communication module, a signal to an external device using the first communication module while the second communication module is in a first state, transitioning the second communication module to a second state based at least in part on the signal, and establishing, using the second communication module, a communication between the electronic device and the external device based at least in part on the transitioning.

According to an aspect of the present invention, an apparatus is provided. The apparatus includes a first communication module configured to provide a first wireless communication, a second communication module configured to provide a second wireless communication, and a controller operatively coupled with the first communication module and the second communication module, the controller configured to transmit, using the first communication module, a signal to an external device in accordance with the first wireless communication while the second communication module is in a first state, transition the second communication module to a second state based at least in part on the signal, and establish, using the second communication module, the second wireless communication between the electronic device and the external device based at least in part on the transitioning.

According to an aspect of the present invention, a machine-readable storage device is provided. The machine-readable storage device includes instructions that, when executed by one or more processors, cause the one or more processors to perform operations comprising receiving, at an electronic device including a first communication module and a second communication module, a signal from an external device using the first communication module while the second communication module is in a first state, transitioning the second communication module to a second state based at least in part on the signal, and establishing, using the second communication module, a communication between the electronic device and the external device based at least in part on the transitioning.

According to an aspect of the present invention, a machine-readable storage device is provided. The machine-readable storage device includes instructions that, when executed by one or more processors, cause the one or more processors to perform operations comprising transmitting, at an electronic device including a first communication module and a second communication module, a signal to an external device using the first communication module while the second communication module is in a first state, transitioning the second communication module to a second state based at least in part on the signal, and establishing, using the second communication module, a communication between the electronic device and the external device based at least in part on the transitioning.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the exemplary embodiments of the present invention, although a Wi-Fi Peer to Peer (Wi-Fi P2P) communication mode is described as a communication mode by which a wireless terminal may establish a connection with a device as an example, the present invention may be applied to all communication modules for performing a data communication function by a connection through a device search as well as the Wi-Fi P2P communication mode.

Figure 1:
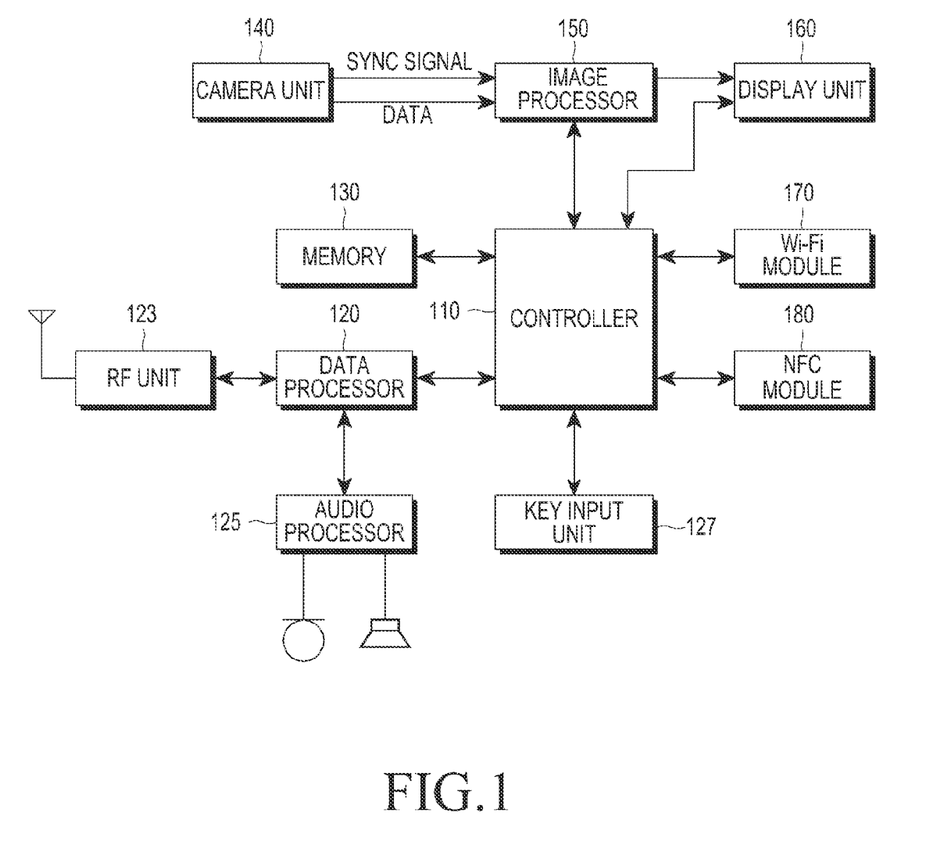
FIG. 1 is a block diagram of a wireless terminal according to an exemplary embodiment of the present invention.

FIG. 1 is a block diagram of a wireless terminal according to an exemplary embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and for amplifying the up-converted transmission signal and an RF receiver for low-noise amplifying a received signal and for down-converting a frequency of the amplified received signal. A data processor 120 includes a transmitter for coding and modulating the transmission signal and a receiver for demodulating and decoding the received signal. In other words, the data processor 120 may include a modem and a codec. The codec includes a data codec for processing packet data and the like, and an audio codec for processing an audio signal such as voice. An audio processor 125 plays a received audio signal output from the audio codec in the data processor 120 and transfers a transmission audio signal picked up by a microphone to the audio codec in the data processor 120.

A key input unit 127 includes alphanumeric keys for inputting alphanumeric information and function keys for setting various functions. As an example, the key input unit 127 may include input buttons, a touchscreen and/or the like.

A memory 130 may include a program memory and a data memory. The program memory may store programs for controlling a general operation of the wireless terminal and programs for controlling the establishment of a Wi-Fi P2P connection to a desired device through near distance communication according to an exemplary embodiment of the present invention. In addition, the data memory may temporarily store data generated while the programs are executed.

A controller 110 controls the overall operation of the wireless terminal. For example, the controller 110 may be operatively connected to the various units and modules of the wireless terminal.

According to an exemplary embodiment of the present invention, the controller 110 controls a near distance communication module 180 (e.g., a Near Field Communication (NFC) module) to exchange device information with a specific device contacted through the near distance communication module 180 and to perform a Wi-Fi P2P connection to the specific device based on the exchanged device information.

In addition, when a near distance communication with a specific device is connected through a contact with the specific device on a Wi-Fi communication connection setup screen of the wireless terminal, the controller 110 controls the wireless terminal to automatically switch to a Wi-Fi P2P mode by enabling a Wi-Fi P2P function.

In this case, when the Wi-Fi P2P function of the specific device including a near distance communication module is disabled, if the near distance communication is connected through the contact with the wireless terminal, the specific device also automatically switches to the Wi-Fi P2P mode by enabling the Wi-Fi P2P function.

In addition, the controller 110 controls the near distance communication module 180 to exchange a Media Access Control (MAC) address with the specific device and to simultaneously perform a device search operation in the Wi-Fi P2P mode.

In addition, as a result of the device search operation, if the specific device is displayed on a display unit 160 on which the device search result is displayed, that is, if a device having a MAC address received from the specific device exists among searched devices, the controller 110 controls the near distance communication module 180 to perform a role determining process and an authentication information exchanging process with the specific device. Accordingly, the controller 110 controls the wireless terminal to perform a Wi-Fi P2P connection to the specific device.

The existence of the specific device among the searched devices indicates that device information for the Wi-Fi P2P connection has been exchanged. Thus, the Wi-Fi P2P connection may be performed by performing the role determining process and the authentication information exchanging process with the specific device already selected through a contact as a device desiring the Wi-Fi P2P connection.

In addition, as a result of the device search operation, if the specific device is not displayed on the display unit 160 on which the device search result is displayed, that is, if a device having the MAC address received from the specific device does not exist among the searched devices, then the controller 110 controls the near distance communication module 180 to exchange device information for the Wi-Fi P2P connection with the specific device. After completing the role determining process and the authentication information exchanging process with the specific device based on device information received from the specific device, the controller 110 controls the near distance communication module 180 to connect communication to the specific device through Wi-Fi Direct communication.

Thus, by using the device information for the Wi-Fi P2P connection that has been received from the specific device through the near distance communication, the Wi-Fi P2P connection may be performed by performing the role determining process and the authentication information exchanging process with the specific device already selected through a contact as a device desiring the Wi-Fi P2P connection.

According to another exemplary embodiment of the present invention, the controller 110 controls the near distance communication module 180 to exchange a MAC address and device information with a specific device contacted through the near distance communication module 180 and to perform a Wi-Fi P2P connection to the specific device based on the exchanged MAC address and device information without performing the device search process, the role determining process, and/or the authentication information exchanging process with the specific device.

A Wi-Fi module 170 provides a near distance wireless communication function conforming to the IEEE 802.11 standard. According to exemplary embodiments of the present invention, the Wi-Fi module 170 allows a user of the wireless terminal to form (or create) a Wi-Fi P2P group to use a data exchange function and others.

According to exemplary embodiments of the present invention, the near distance communication module 180 is a communication module for transferring data between devices within a near distance. The near distance communication module 180 exchanges a MAC address and device information for a Wi-Fi P2P connection with a specific device contacted according to an exemplary embodiment of the present invention by being communication-connected to the specific device. According to an exemplary embodiment of the present invention, the near distance communication module 180 may be a Near Field Communication (NFC) module.

The wireless terminal may also include a camera unit 140. The camera unit 140 includes a camera sensor for capturing image data and converting the captured optical signal into an electrical signal, and a signal processor for converting an analog image signal captured by the camera sensor into digital data. The camera sensor is assumed herein to be a Charge-Coupled Device (CCD) or a Complementary Metal Oxide Semiconductor (CMOS) sensor, and the signal processor may be realized by a Digital Signal Processor (DSP). The camera sensor and the signal processor may be realized in an integrated manner or in a separated manner.

The wireless terminal may include an image processor 150 that performs Image Signal Processing (ISP) for displaying image signals output from the camera unit 140 on the display unit 160. The ISP performs functions such as gamma correction, interpolation, spatial variation, image effects, image scaling, Automatic White Balance (AWB), Automatic Exposure (AE), and Automatic Focusing (AF). For example, the image processor 150 processes the image signals output from the camera unit 140 on a frame basis, and outputs the frame-based image data according to the characteristics and size of the display unit 160. The image processor 150, which includes a video codec, compresses frame image data displayed on the display unit 160 by preset coding, and restores (or decompresses) the compressed frame image data into its original frame image data. As an example, the video codec may include a JPEG codec, MPEG4 codec, Wavelet codec, and/or the like. Assuming that the image processor 150 includes an On-Screen Display (OSD) function, the controller 110 may control the image processor 150 to output OSD data according to the size of a screen on which the data is displayed.

The display unit 160 displays an image output from the image processor 150 and user data output from the controller 110 on a screen. The display unit 160 may include a Liquid Crystal Display (LCD), and in this case, the display unit 160 includes an LCD controller, a memory for storing image data, and an LCD panel. The display unit may serve as an input unit with a touch screen, and in this case, the display unit 160 may display the alphanumeric keys of the key input unit 127. For example, the LCD may include a touch screen which may also serve as the key input unit 127.

A process of connecting to a device in the wireless terminal is described in detail with reference to FIGS. 2 and 3.

Figure 2:
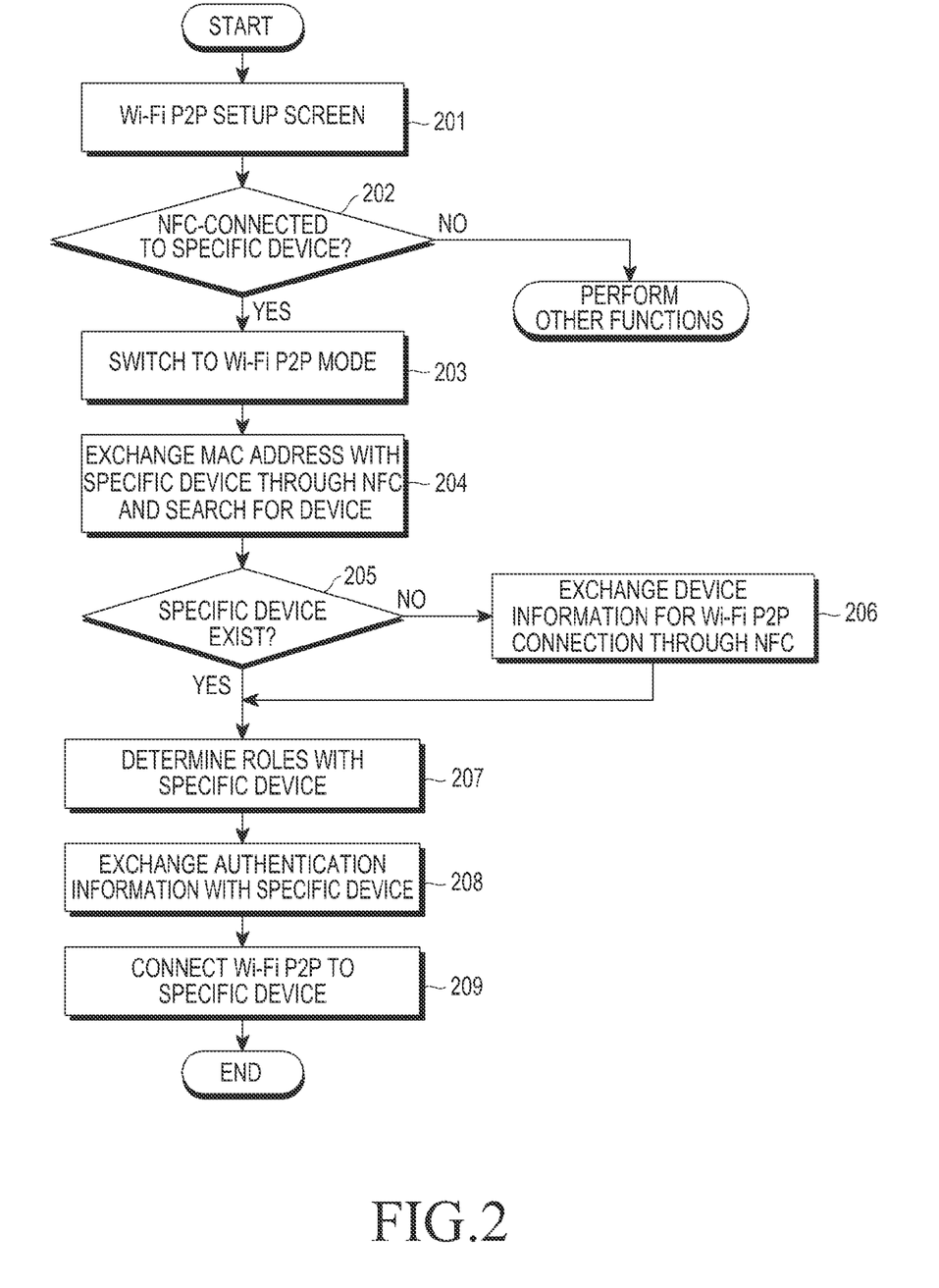
FIG. 2 is a flowchart illustrating a process of Wi-Fi Peer to Peer (Wi-Fi P2P) connecting to a desired device performed by a wireless terminal, according to an exemplary embodiment of the present invention.

FIG. 2 is a flowchart illustrating a process of Wi-Fi P2P connecting to a desired device performed by a wireless terminal, according to an exemplary embodiment of the present invention.

This exemplary embodiment of the present invention is described in detail with reference to FIG. 1.

Referring to FIG. 2, at step 201 a Wi-Fi P2P setup screen of the wireless terminal is displayed by the display unit 160. At step 202, the controller 110 determines whether the wireless terminal is connected to a specific device desiring a Wi-Fi P2P connection through the NFC module 180 via near distance communication. In other words, the controller 110 determines whether the near distance communication module 180 is connected to a specific device when the wireless terminal contacts with the specific device. If the controller 110 determines that the wireless terminal is connected to a specific device via near distance communication, then the controller 110 proceeds to step 203 to automatically switch to the Wi-Fi P2P mode by enabling the Wi-Fi P2P function of the wireless terminal. Otherwise, if the controller 110 determines that the wireless terminal is not connected to a specific device via near distance communication, then the controller proceeds to perform other functions.

Further, at step 203, if the Wi-Fi P2P function of the specific device is disabled, the specific device may automatically switch to the Wi-Fi P2P mode by enabling the Wi-Fi P2P function of the specific device through the near distance communication connection to the wireless terminal.

If the near distance communication between the wireless terminal and the specific device is connected through the NFC module 180, then the controller 110 exchanges a MAC address with the specific device and simultaneously performs a device search in step 204.

At step 205, the controller 110 determines, as a result of the device search, whether a device having the MAC address received from the specific device exists among the searched devices. If the controller 110 determines that a device having the MAC address received from the specific device exists among the searched devices, then the controller 110 proceeds to step 207 to determine roles with the specific device. The controller 110 further proceeds to step 208 to exchange authentication information with the specific device. The controller 110 then proceeds to step 209 to establish a Wi-Fi P2P connection with the specific device.

The existence of the specific device among the searched devices indicates that device information for the Wi-Fi P2P connection has been exchanged. In addition, the near distance communication connection of the wireless terminal to the specific device indicates that the wireless terminal has already selected the specific device as a device desiring the Wi-Fi P2P connection. Thus, if the specific device exists among the searched devices, the Wi-Fi P2P connection may be performed by performing the role determining process and the authentication information exchanging process with the specific device.

However, at step 205, if the controller 110 determines, as a result of the device search, that no device having the MAC address received from the specific device exists among the searched devices, then the controller 110 proceeds to step 206 to exchange device information for the Wi-Fi P2P connection with the specific device through the NFC module that corresponds to the near distance communication module 180.

Thereafter, the controller 110 proceeds to step 207 to determine roles with the specific device and to step 208 to exchange authentication information with the specific device. The controller 110 then proceeds to step 209 to establish a Wi-Fi P2P connection with the specific device.

Figure 3:
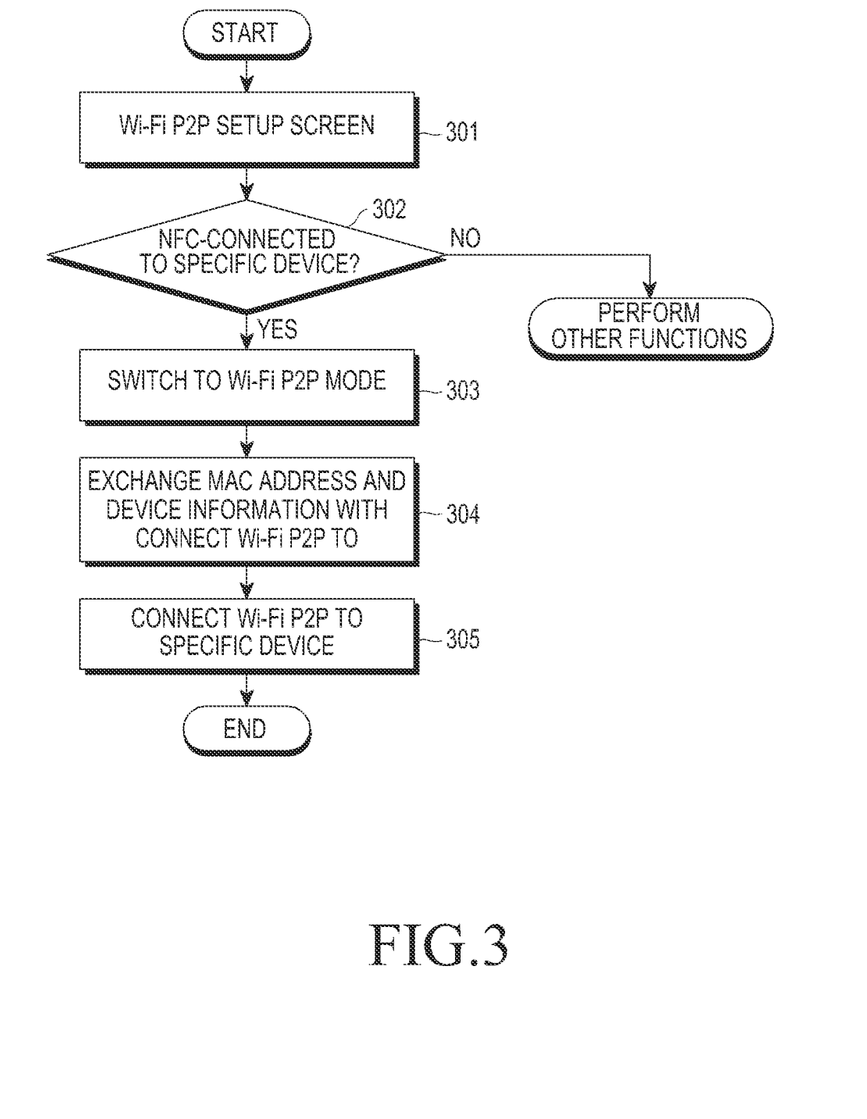
FIG. 3 is a flowchart illustrating a process of Wi-Fi P2P connecting to a desired device performed by a wireless terminal, according to another exemplary embodiment of the present invention.

FIG. 3 is a flowchart illustrating a process of Wi-Fi P2P connecting to a desired device performed by a wireless terminal, according to another exemplary embodiment of the present invention.

This exemplary embodiment of the present invention nis described in detail with reference to FIG. 1.

Referring to FIG. 3, at step 301 a Wi-Fi P2P setup screen of the wireless terminal is displayed by the display unit 160. At step 302, the controller 110 determines whether the wireless terminal is connected to a specific device desiring a Wi-Fi P2P connection through the NFC module 180 (e.g., the near distance communication module 180). In other words, the controller 110 determines whether the near distance communication module 180 is connected to a specific device when the wireless terminal contacts with the specific device. If the controller 110 determines that the wireless terminal is connected to a specific device via near distance communication, then the controller 110 proceeds to step 303 to automatically switch to the Wi-Fi P2P mode by enabling the Wi-Fi P2P function of the wireless terminal. Otherwise, if the controller 110 determines that the wireless terminal is not connected to a specific device via near distance communication, then the controller 110 proceeds to perform other functions.

Further, at step 303, if the Wi-Fi P2P function of the specific device is disabled, the specific device may automatically switch to the Wi-Fi P2P mode by enabling the Wi-Fi P2P function of the specific device through the near distance communication connection to the wireless terminal.

If the near distance communication between the wireless terminal and the specific device is connected through the NFC module (e.g., the near distance communication module) 180, then the controller 110 exchanges a MAC address and device information for a Wi-Fi P2P connection with the specific device in step 304.

In step 305, the controller 110 establishes a Wi-Fi P2P connection with the specific device based on the MAC address and the device information for the Wi-Fi P2P connection that have been received from the specific device without performing a device search process, a process of determining roles with the specific device, and a process of exchanging authentication information with the specific device.

As is apparent from the foregoing description, the proposed apparatus and method for connecting to a device in a wireless terminal, by which communication is connected through a contact between devices including a near distance communication module, maximize the utilization of Wi-Fi P2P and provide convenience in connection of communication with only a contact with a desired device. In addition, because accessibility that must be accompanied by a user's intention is required for a mutual contact between devices including a near distance communication module, there is a big advantage even in a problem related to security While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
receiving, at an electronic device including a first communication module and a second communication module, a signal from an external device using the first communication module while the second communication module is in a first state;
transitioning the second communication module to a second state based at least in part on the signal; and
establishing, using the second communication module, a communication between the electronic device and the external device based at least in part on the transitioning.

2. The method of claim 1, wherein the receiving is performed in response to the external device being in proximity of the electronic device.

3. The method of claim 1, wherein the first communication module comprises a near field communication module or a bluetooth module.

4. The method of claim 1, wherein the second communication module comprises a wi-fi module.

5. The method of claim 1, wherein the first state comprises an inactive state and the second state comprises an active state.

6. The method of claim 1, wherein the establishing comprises:
setting the second communication module to a mode to perform a peer to peer communication.

7. The method of claim 1, wherein the establishing comprises:
receiving, using the first communication module, a device identifier corresponding to the external device from the external device.

8. The method of claim 7, wherein the device identifier comprises a media access control address or a device name.

9. The method of claim 1, wherein the establishing comprises:
transmitting authentication information to the external device.

10. An apparatus comprising:
a first communication module configured to provide a first wireless communication;
a second communication module configured to provide a second wireless communication; and
a controller operatively coupled with the first communication module and the second communication module, the controller configured to:
receive, using the first communication module, a signal from an external device in accordance with the first wireless communication while the second communication module is in a first state, transition the second communication module to a second state based at least in part on the signal, and establish, using the second communication module, the second wireless communication between the electronic device and the external device based at least in part on the transitioning.

11. The apparatus of claim 10, wherein the first communication module comprises a near field communication module or a bluetooth module.

12. The apparatus of claim 10, wherein the second communication module comprises a wi-fi module.

13. The apparatus of claim 10, wherein the first state comprises an inactive state and the second state comprises an active state.

14. The apparatus of claim 10, wherein the controller is further configured to:

set the second communication module to a mode to perform a peer to peer communication.

15. The apparatus of claim 10, wherein the controller is further configured to:

receive, using the first communication module, a device identifier corresponding to the external device from the external device.

16. A method comprising:

transmitting, at an electronic device including a first communication module and a second communication module, a signal to an external device using the first communication module while the second communication module is in a first state;

transitioning the second communication module to a second state based at least in part on the signal; and establishing, using the second communication module, a communication between the electronic device and the external device based at least in part on the transitioning.

17. The method of claim 16, wherein the first state comprise an inactive state and the second state comprises an active state.

18. The method of claim 16, wherein the establishing comprises:

setting the second communication module to a mode to perform a peer to peer communication.

19. The method of claim 16, wherein the establishing comprises:

receiving, using the first communication module, a device identifier corresponding to the external device from the external device; and searching one or more external devices including the external device based at least in part on the device identifier.

20. The method of claim 19, wherein the searching comprises:

selecting at least one external device of the one or more external devices as the external device based at least in part on a determination that another device identifier received from the at least one external device corresponds to the device identifier.

21. An apparatus comprising:

a first communication module configured to provide a first wireless communication;

a second communication module configured to provide a second wireless communication; and a controller operatively coupled with the first communication module and the second communication module, the controller configured to:

transmit, using the first communication module, a signal to an external device in accordance with the first wireless communication while the second communication module is in a first state, transition the second communication module to a second state based at least in part on the signal, and establish, using the second communication module, the second wireless communication between the electronic device and the external device based at least in part on the transitioning.

22. The apparatus of claim 21, wherein the first communication module comprises a near field communication module or a bluetooth module and the second communication module comprises a wi-fi module.

23. The apparatus of claim 21, wherein the controller is further configured to:

set the second communication module to a mode to perform a peer to peer communication.

24. The apparatus of claim 21, wherein the controller is further configured to:

receive, using the first communication module, a device identifier corresponding to the external device from the external device; and search one or more external devices including the external device based at least in part on the device identifier.

25. The apparatus of claim 24, wherein the controller is further configured to:

select at least one external device of the one or more external devices as the external device based at least in part on a determination that another device identifier received from the at least one external device corresponds to the device identifier.

26. A machine-readable storage device storing instructions that, when executed by one or more processors, cause the one or more processors to perform operations comprising:

receiving, at an electronic device including a first communication module and a second communication module, a signal from an external device using the first communication module while the second communication module is in a first state;

transitioning the second communication module to a second state based at least in part on the signal; and establishing, using the second communication module, a communication between the electronic device and the external device based at least in part on the transitioning.

27. The machine-readable storage device of claim 26, wherein the establishing comprises;

setting the second communication module to a mode to perform a peer to peer communication.

28. A machine-readable storage device storing instructions that, when executed by one or more processors, cause the one or more processors to perform operations comprising:

transmitting, at an electronic device including a first communication module and a second communication module, a signal to an external device using the first communication module while the second communication module is in a first state;

transitioning the second communication module to a second state based at least in part on the signal; and establishing, using the second communication module, a communication between the electronic device and the external device based at least in part on the transitioning.

29. The machine-readable storage device of claim 28, wherein the establishing comprises:
  receiving, using the first communication module, a device identifier corresponding to the external device from the external device; and
  searching one or more external devices including the external device based at least in part on the device identifier.

30. The machine-readable storage device of claim 28, wherein the searching comprises:
  selecting at least one external device of the one or more external devices as the external device based at least in part on a determination that another device identifier received from the at least one external device corresponds to the device identifier.

* * * * *